United States Patent
Wang et al.

(10) Patent No.: US 11,564,013 B2
(45) Date of Patent: Jan. 24, 2023

(54) CONTENT RECOMMENDATION GENERATION USING CONTENT BASED ON BI-DIRECTIONAL PREDICTION

(71) Applicant: HULU, LLC, Santa Monica, CA (US)

(72) Inventors: Peng Wang, Beijing (CN); Yunsheng Jiang, Beijing (CN); Diman Shen, Beijing (CN); Yaqi Wang, Beijing (CN); Xiaohui Xie, Beijing (CN); Brian Thomas Morrison, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/074,225

(22) Filed: Oct. 19, 2020

(65) Prior Publication Data

US 2022/0124409 A1    Apr. 21, 2022

(51) Int. Cl.
| | |
|---|---|
| *H04N 21/466* | (2011.01) |
| *H04N 21/45* | (2011.01) |
| *H04N 21/442* | (2011.01) |
| *G06F 16/735* | (2019.01) |
| *G06F 16/2457* | (2019.01) |
| *G06N 7/00* | (2006.01) |
| *H04N 21/44* | (2011.01) |
| *G06V 20/40* | (2022.01) |

(52) U.S. Cl.
CPC ... *H04N 21/4668* (2013.01); *G06F 16/24578* (2019.01); *G06F 16/735* (2019.01); *G06N 7/005* (2013.01); *H04N 21/44008* (2013.01); *H04N 21/44222* (2013.01); *H04N 21/4532* (2013.01); *H04N 21/4667* (2013.01); *G06V 20/41* (2022.01)

(58) Field of Classification Search
CPC ......... H04N 21/4668; H04N 21/44008; H04N 21/44222; H04N 21/4532; H04N 21/4667; G06F 16/24578; G06F 16/735; G06N 7/005

See application file for complete search history.

(56) References Cited

U.S. PATENT DOCUMENTS

| | | | | |
|---|---|---|---|---|
| 2003/0237095 A1* | 12/2003 | Srinivas | ............... | H04N 21/466 725/46 |
| 2013/0311408 A1* | 11/2013 | Bagga | .................... | G06Q 30/02 706/12 |
| 2014/0259037 A1* | 9/2014 | Belyaev | ........... | H04N 21/44008 725/14 |

OTHER PUBLICATIONS

Devlin, Jacob, et al. "Bert: Pre-training of Deep Bidirectional Transformers for Language Understanding." arXiv preprint arXiv:1810.04805, 16 pages (2018).

(Continued)

*Primary Examiner* — Nnenna N Ekpo
(74) *Attorney, Agent, or Firm* — Kwan & Olynick LLP (57) ABSTRACT

In some embodiments, a method receives a history of videos that were viewed on a video delivery system as a first sentence in a sequential order and a target video as a second sentence as input to a prediction network. The prediction network analyzes representations for the history of videos and a representation of the target video. The prediction network generates a session representation based on bidirectionally analyzing a sequence of the first representations and the second representation. The method uses the session representation to determine whether to recommend the target video.

20 Claims, 8 Drawing Sheets

(56) References Cited

OTHER PUBLICATIONS

Sami Abu-El-Haija, Nisarg Kothari, Joonseok Lee, Paul Natsev, George Toderici, Balakrishnan Varadarajan, and Sudheendra Vijayanarasimhan, "Youtube-8m: A large-scale video classification benchmark." arXiv preprint arXiv:1609.08675, (2016).
AudioSet data description: https://research.google.com/audioset/download.html, 18 pages, Sep. 29, 2020.
AudioSet GitHub Repository: https://github.com/tensorflow/models/tree/master/research/audioset, 2 pages, Sep. 29, 2020.
Arandjelovic, Relja, et al. "NetVLAD: CNN architecture for weakly supervised place recognition." Proceedings of the IEEE conference on computer vision and pattern recognition. (2016). Rev. Dec., 17 pages.
Lin, Rongcheng, Jing Xiao, and Jianping Fan. "NeXtVLAD: An efficient Neural Network to Aggregate Frame-level Features for Large-Scale Video Classification." Proceedings of the European Conference on Computer Vision (ECCV) 13 pages, (2018).

\* cited by examiner

CONTENT RECOMMENDATION GENERATION USING CONTENT BASED ON BI-DIRECTIONAL PREDICTION

BACKGROUND

A video delivery system uses a video recommendation system to recommend videos to users. When the recommendations are of interest to the users, the users may spend more time on the video delivery system viewing the recommended videos. Existing recommendation systems select recommendation candidates based on implicit feedback from users, such as watch behavior and search behavior. Implicit feedback is derived from user actions, in contrast to explicit feedback provided by users that may specify which videos the users like. Deriving implicit feedback requires that the users use the video delivery system and watch videos on the system. Then, the video delivery system can determine the watch and the search behaviors of the users with respect to the videos. However, when a video (e.g., an episode of a show) is new and added to the library of videos of the video delivery system, the recommendation system may perform poorly. This may be referred to as a content cold start problem where a new video has very little behaviors from user accounts and the recommendation system cannot accurately recommend the video to users.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a recommendation system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A recommendation system may analyze the content of a video itself to generate recommendations. For example, a video may include content, such as video and/or audio, of a program or show. The content of the video may include information that can be used to generate recommendations. The information may be different than typical information used by recommendation systems, such as the implicit behavior of users or metadata associated with the videos. For example, the content of the video may include temporal frames of video, audio, and burnt-in closed captions. The recommendation system may analyze the content at the frame level to determine a representation of the video that may be used to recommend the video to users.

The recommendation system may then use a watch history of a user to generate recommendations for the user. The watch history may include a temporal list of videos that were viewed by the user. The recommendation system may generate a representation of each video as described above. Then, the recommendation system generates recommendations based on a relevance to the watch history to one or more target videos. As will be described in more detail below, the recommendation system may use a bi-directional analysis of the watch history to generate the recommendations. The bi-directional analysis is different from a typical left-to-right analysis of the watch history. Using the bi-directional analysis allows the recommendation system to generate more context from the watch history and generates better recommendations. For instance, what a user watched before and after one video may be important and provide some context for future recommendations. This is different from just considering the progression of choices by a user.

System Overview

Figure 1:
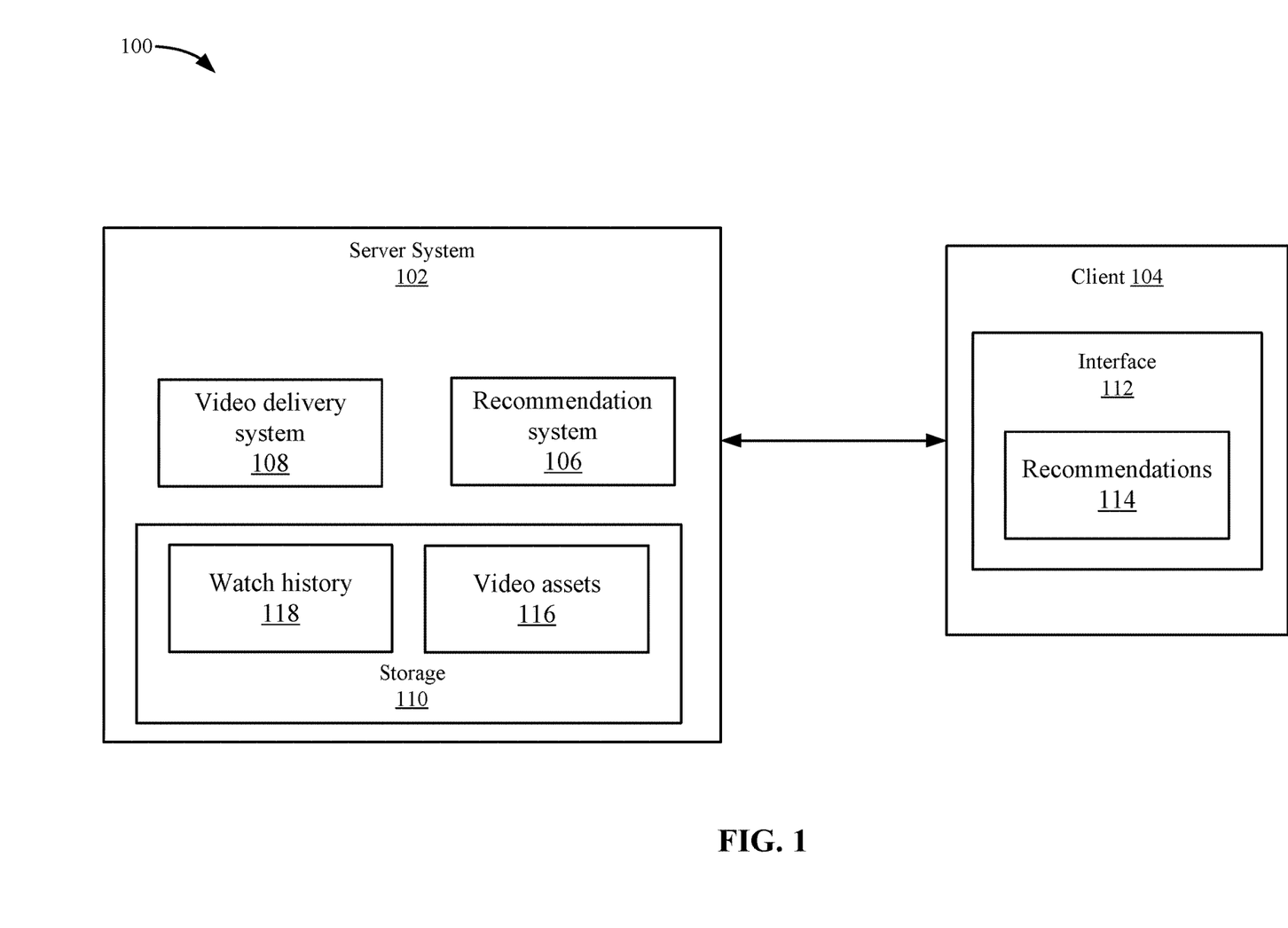
FIG. 1 depicts a simplified system for generating recommendations according to some embodiments.

FIG. 1 depicts a simplified system 100 for generating recommendations according to some embodiments. A server system 102 generates recommendations 114 for a client device 104. Client device 104 may receive personalized recommendations 114 that are displayed on a user interface 112. For example, the recommendations may be provided for a user account, which may be used by one or more users. Although one client device is shown, server system may generate recommendations 114 for multiple client devices 104. Also, different user accounts (or the same user account) may use different client devices 104 and server system 102 generates personalized recommendations 114 for each user account. Recommendations 114 may include one or more recommendations and may be displayed in different formats on user interface 112.

Server system 102 includes a video delivery system 108 that can deliver videos to clients 104, which can be viewed in user interface 112. A video may be any type of content, such as a show, movie, clip, live event, live show, etc. Also, a video may include different types of content, such as video, audio, an image, or an advertisement. Any part of the content may be analyzed to generate recommendations. A video may refer to data that is sent to clients 104 for viewing on interface 112 when a video title is selected for viewing on video delivery system 108.

While receiving interactions with user interface 112, video delivery system 108 may record user account behavior. User account behavior may include different actions taken by the user account (e.g., by the actions of a user). Different examples of user account behavior may be what videos the user account watches, what recommendations the user account selects, searches performed by the user account, and other actions taken while the user account uses video delivery system 108. User account behavior may also include implicit and explicit feedback from user accounts. Explicit feedback may include feedback on which videos the user account has liked, such as by ratings on the video. Implicit feedback may be implied from user accounts actions on the service, such as videos the user account did select to view and did not select to view.

Storage 110 may include a watch history 118 and video assets 116. Watch history 118 may include a list of videos that a user account has viewed. Watch history 118 may vary per user account. Also, the programs in watch history 118 that are used to generate recommendations 114 may be all the programs watched by a user account or a portion of the programs in watch history 118. A portion of watch history 118 may be the programs watched in the last week, two weeks, a month, a year, etc. Video assets 116 may be include videos that are offered by video delivery system 108 and can be viewed by client 104. Video assets 116 may be based on an asset level, which may identify a show, movie, or episode. Also, video assets 116 may be on a video file level, which may include different video files for the same asset, such as a show, and the different video files may include different characteristics of different bitrates and quality levels. For discussion purposes, the term video assets may be used interchangeably with the term videos. Also, the term video may refer to a video asset or video file. For example, a video asset of a title of a show #1 or an episode of show #1 may be recommended or a specific video file for a video asset.

Recommendation system 106 uses a bi-directional analysis of a user account's watch history to generate recommendations 114. In some embodiments, a recommendation system 106 uses a model that treats the videos similarly to a natural language processing (NLP) analysis. For example, recommendation system 106 may model the context and relations of words in a sentence or sentences and determines a context of a word by looking at words that come before and after a specific word. In this case, recommendation system 106 may treat the user account watch history as a sentence or sentences and determines the context of a video in the watch history by looking at the videos that come before and after the respective video. The context of the video may provide information on how important the video is in the user account watch history.

By using a modeling of the content of respective videos in the watch history, recommendation system 106 addresses the problem caused by the content cold start. Using the content of the video does not require user account behavior to watch a video to generate recommendations for that video. Rather, recommendation system 106 may model the content of the user account watch history 118 and the content of other videos to determine whether to recommend the other videos. In some cases, the other videos may be newer videos that do not have a large amount of watch history, such as a watch history is below a threshold (e.g., the number of times the video asset has been watched is below X times). This will improve the recommendations for the new videos and in general improve recommendations for user accounts using the bi-directional analysis of user account watch history 118.

Recommendation System

Figure 2:
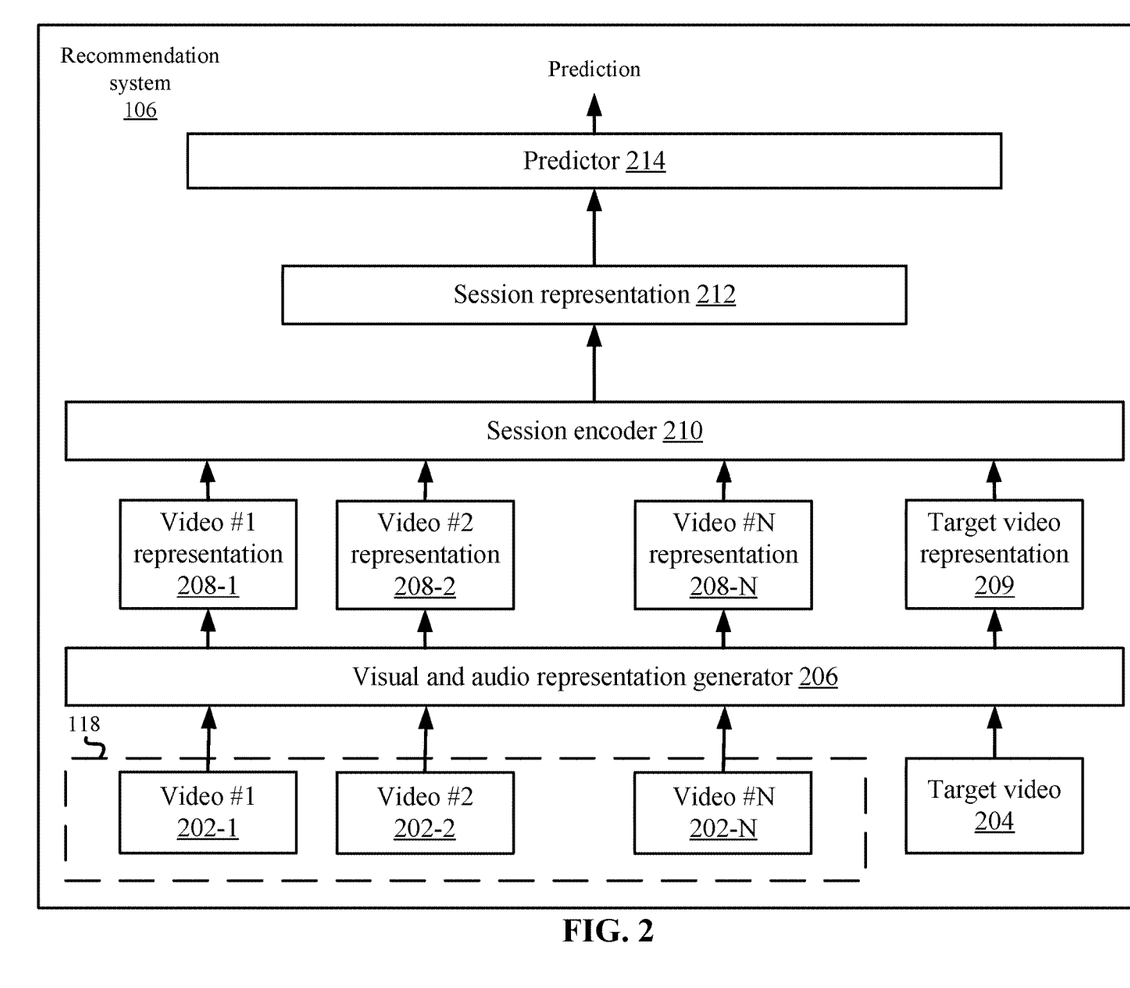
FIG. 2 depicts a more detailed example of a recommendation system according to some embodiments.

FIG. 2 depicts a more detailed example of recommendation system 106 according to some embodiments. Recommendation system 106 receives a watch history 118 that includes video #1 202-1, video #2 202-2 to video #N 202-N. For example, a user account may view a series of programs (e.g., an episode #1 of a show #1, an episode #4 of a show #2, etc.) in a certain order that is represented in watch history 118. Recommendation system 106 may also generate a prediction for a recommendation of a target video 204. Target video 204 may be another video, such as an episode #2 of show #1, episode #5 of a show #3, a movie, etc. In some embodiments, recommendation system 106 may determine the probability of a user account selecting target video 204 in view of the user account's watch history 118. Recommendation system 106 may determine probabilities for multiple target videos 204, such as an entire library of videos, a portion of the library of videos, or a new video that is received. In some embodiments, target videos 204 may be videos not found in watch history 118.

Recommendation system 106 may first determine representations of the videos in watch history 118 and target video 204. A representation may be one or more values within a space that could represent the content of the video. For example, recommendation system 106 generates a content embedding representation in a content embedding space for each respective video. A content embedding may be a vector in the space that represents characteristics of a video. Then, vectors that are closer in the space may be more similar.

Video and audio representation generator 206 analyzes the content (e.g., video and/or the audio) of each respective video to generate a video representation. As shown, video and audio representation generator 206 generates a video #1 representation 208-1, a video #2 representation 208-2 to a video #N representation 208-N for respective videos 202-1 to 202-N in user account watch history 118. Also, video and audio representation generator 206 generates a target video representation 209 for target video 204.

Figure 3:
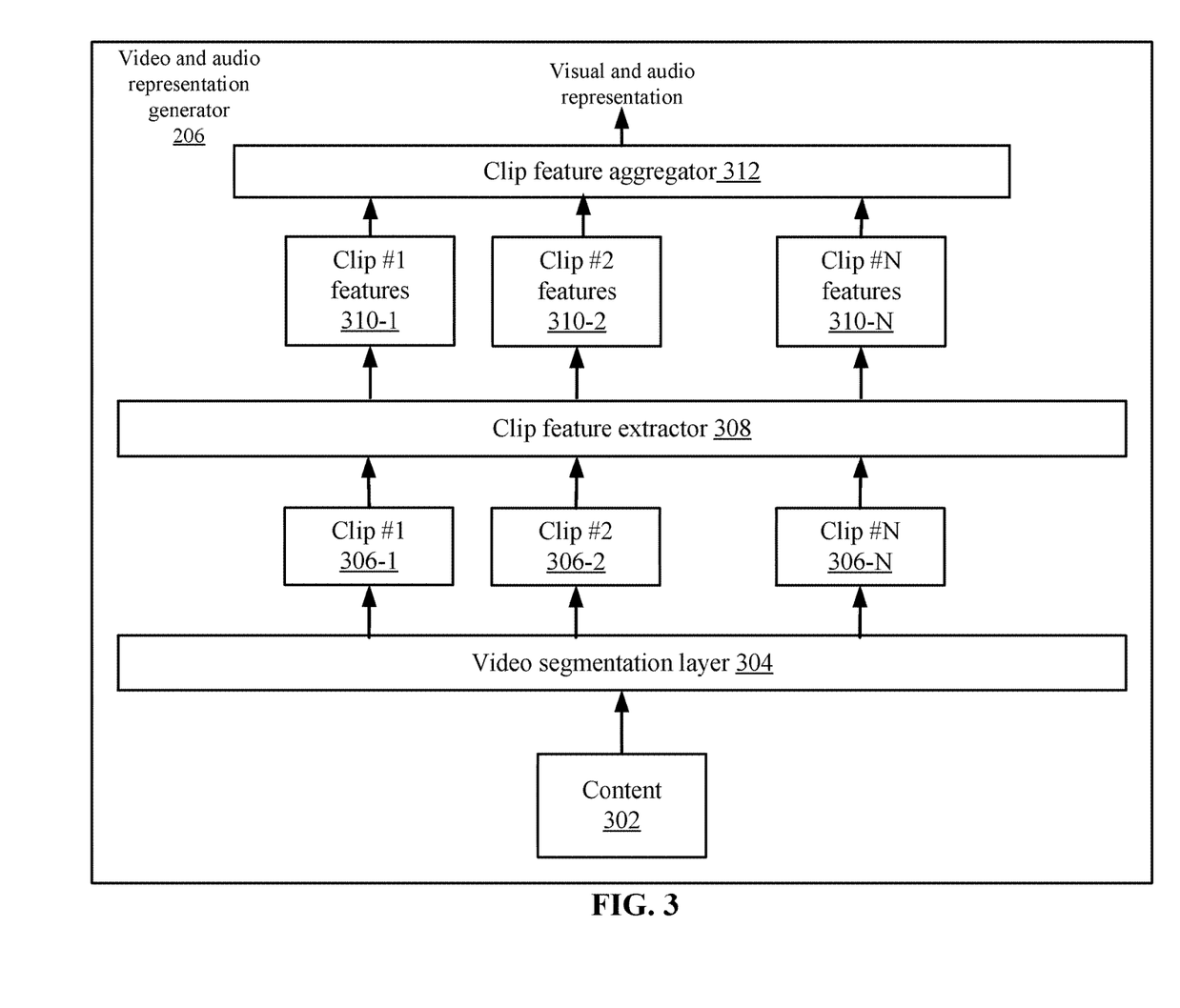
FIG. 3 depicts a more detailed example of a video and audio representation generator according to some embodiments.

FIG. 3 depicts a more detailed example of video and audio representation generator 206 according to some embodiments. Video and audio representation generator 206 may perform the following process for each video 202 and target video 204. In some embodiments, video and audio representation generator 206 may generate video and audio representations prior to generating recommendations, but may generate the representations in real-time when generating a recommendation. Once the video and audio representation is generated, video and audio representation generator 206 may not need to generate another representation. This is because the video and audio representation is based on the content of video 202 or target video 204, which may not change over time.

Video and audio representation generator 206 receives content 302 (e.g., audio and video) from a video. A video segmentation layer 304 segments the video and/or audio into clips 306. Typically, the duration of a video may be long, such as 30 minutes to 1 hour of video. Also, a show may contain multiple episodes. If the show is to be analyzed based on all its episodes, then video and audio representation generator 206 would have to analyze a large amount of content. Accordingly, video segmentation layer 304 may segment the video and/or audio into smaller segments to facilitate the analysis of the video content, but the entire video may be analyzed at once. Each clip #1 306-1, clip #2 306-2 to clip #N 306-N may include a portion of the content, such as several minutes of content. In some embodiments, video segmentation layer 304 may segment the video based on certain requirements, such as segmentations at boundaries formed by shots using shot detection or at boundaries formed by scenes using scene detection. A shot may be a camera angle that is continuously capturing content until another shot from another camera angle occurs. A scene may be multiple camera angles that occur in a same setting.

Once clips 306 are generated, a clip feature extractor 308 extracts each clip's visual and audio features. A video clip may be short, such as a couple minutes, and clip feature extractor 308 may efficiently extract the features from a clip and summarize the features as a representation, such as a vector. Clip #1 features 310-1, clip #2 features 310-2 to clip #N features 310-N represent respective feature representations for respective clips 306. The features may represent characteristics of the video, such as edges, color, lightness, objects, etc., and/or audio.

Once clip features 310 are generated, a clip feature aggregator 312 may generate a visual and/or audio representation for the clips. The visual and/or audio representation represents an aggregation of the clip features 310. In some embodiments, clip feature aggregator 312 may average all clip features 310. This averaging may capture the distribution of clip features, but does not model the temporal information of video clips. Accordingly, clip feature aggregator 312 may aggregate clip features 310 using the order or the dependency of clip features 310 on each other. For example, clip feature aggregator 312 may use a bi-directional model that uses the temporal history of clip features 310 in the content, such as by using a time in the video for the clip features. Also, clip features 310 may be related both in the forward direction and the backward direction. Accordingly, clip feature aggregator 312 may capture a bi-directional correlation in the sequence of clip features 310 to generate the visual and audio representation.

In some embodiments, video and audio representation generator 206 uses a multi-head attention mechanism that allows the model to jointly attend to information from different representation subspaces at different positions. This produces a bi-directional analysis of the content. The attention may be a vector of importance weights that is used to predict or infer one element, such as a word in a sentence. The attention vector estimates how strongly the element is correlated with (or "attends to") other elements and takes the sum of their values weighted by the attention vector as the approximation of the target. Rather than only computing the attention vector once, the multi-head mechanism runs through the scaled dot-product attention of elements in the content multiple times in parallel. The independent attention outputs are concatenated and linearly transformed into the expected dimensions.

Referring back to FIG. 2, video and audio representation generator 206 outputs video #1 representation 208-1, video #2 representation 208-2, and so on, to video #N representation 208-N for a user account watch history 118 and target video representation 209 for target video 204. Each video representation may summarize the content of a respective video. Session encoder 210 generates a session representation 212 that represents video #1 representation 208-1 to video #N representation 208-N and target video representation 209. Session representation 212 may be the representation for this watch history and target video representation 209. Instead of using a uni-directional model, such as a left to right uni-directional model, session encoder 210 may use a bi-directional model that considers the sequence in the backward direction and the forward direction, such as by using a multi-head attention mechanism as described above.

Figure 4:
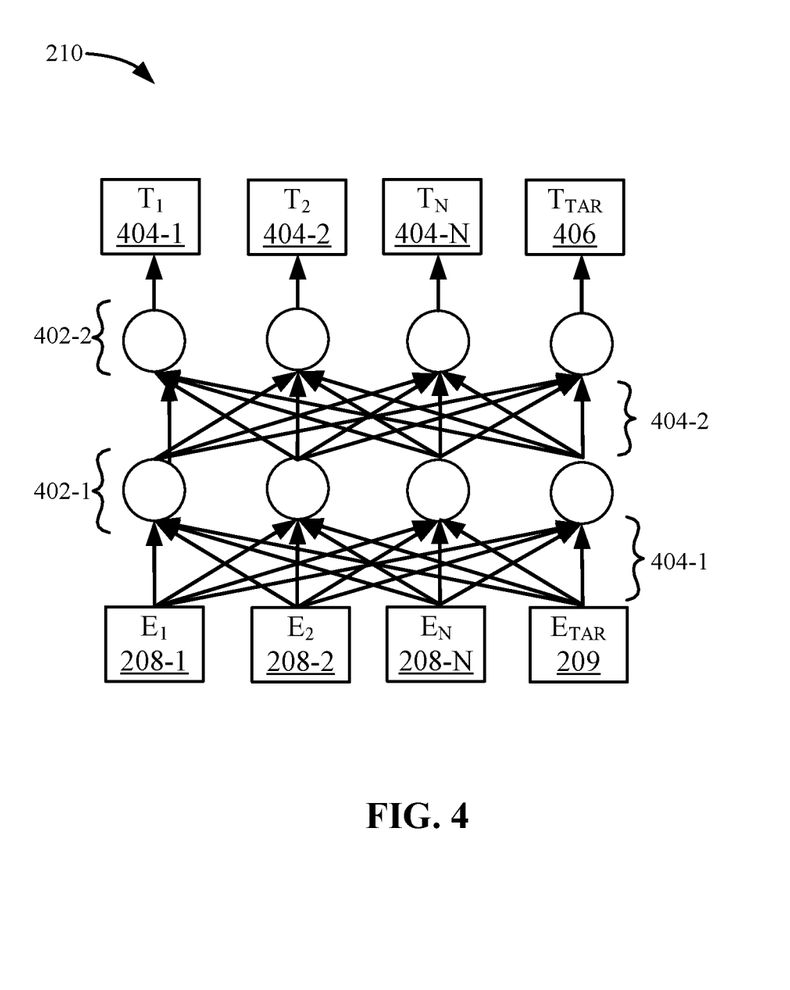
FIG. 4 depicts a more detailed example of a session encoder according to some embodiments.

FIG. 4 depicts a more detailed description of session encoder 210 according to some embodiments. A network of nodes 402-1 to 402-2 (collectively nodes 402) receives video representations 208-1 to 208-N and target video representation 209. As shown, these are represented by embeddings $E_1$ 208-1 to $E_N$ 208-N and $E_{TAR}$ 209. Each embedding may be input into a first layer 402-1 of nodes. Each node may be a transformer that models relationships between all words in a sentence regardless of their position. For example, if each embedding is associated with a word in a sentence, each transformer may model the relationships between those embeddings. For example, for an embedding $E_2$ 208-2, a transformer compares the embedding to every other embedding. The result of these comparisons is an attention score for every other embedding. The attention scores determine how much each of the other embeddings should contribute to the next representation in layer 402-2. In one example, embedding $E_2$ could receive a high attention score when computing a new representation for embedding $E_1$. The attention scores are then used as weights for a weighted average for all representations that are fed into a fully connected network to generate a new representation for embedding $E_2$.

Each layer 402 is fully connected. For example, layer 402-1 is fully connected to embeddings $E_1$ 208-1 to $E_N$ 208-N and $E_{TAR}$ 209 through a fully connected network 404-1. Also, layer 402-2 is fully connected to all nodes in layer 402-1 through a network 404-2. Although two networks are described, it will be understood that session encoder 210 may include multiple networks. The final layer, such as layer 402-2, outputs transformed representations $T_1$ 404-1 to $T_N$ 404-N for embeddings $E_1$ 208-1 to $E_N$ 208-N. Also, the final layer outputs a transformed embedding $T_{TAR}$ 406 for embedding 209 for target video 204.

Accordingly, session encoder 210 may generate a new representation per embedding based on the entire context of other embeddings. This transformed embedding is bi-directional and takes into account embeddings in both the forward direction and the backward direction.

Figure 5:
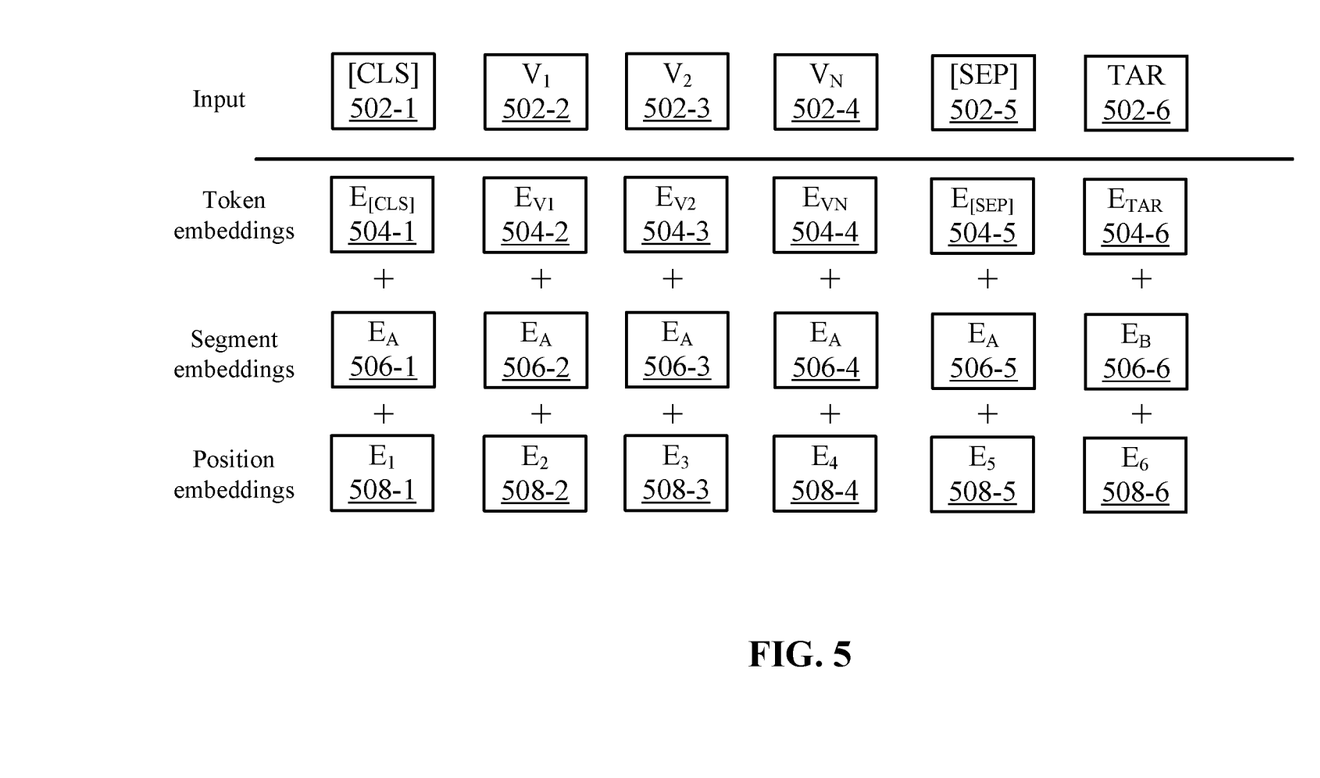
FIG. 5 depicts the input into the session encoder such that a watch history and a target video can be modeled as two sentences according to some embodiments.

As mentioned above, watch history 118 and target video 204 may be modeled as sentences when being processed by session encoder 210. For example, watch history 118 may be a first sentence (or more than one sentence) and target video 204 may be another sentence (e.g., a second sentence or a sentence after the sentences for watch history 118). FIG. 5 depicts the input into session encoder 210 such that watch history 118 and target video 204 can be modeled as two sentences according to some embodiments. Although two sentences are shown, watch history 118 and target video 204 may be modeled as more than two sentences. The input is shown at 502-1 to 502-6 and includes a classifier [CLS] 502-1, video embeddings for videos in watch history 118 represented by $V_1$ 502-2, $V_2$ 502-3 to $V_N$ 502-4. A marker that represents the separation of sentences is shown as [SEP] 502-5. Then, an embedding for target video 204 is shown at TAR 502-6.

The input may be broken down into a combination of three embeddings. For example, the input is a combination of token embeddings, segment embeddings, and position embeddings. Token embeddings 504-1 to 504-6 may be video #1 representation 208-1 to 208-N and target video representation 209. For example, token embeddings $E_{V1}$ 504-2, $E_{V2}$ 504-3 to $E_{VN}$ 504-4 correspond to video #1 representation 208-1 to video number N representation 208-N. Embedding $E_{TAR}$ 504-6 is for target representation 209. Embedding 504-1 is for the classifier [CLS] and embedding 504-5 is for the separator [SEP].

Segment embeddings 506-1 to 506-6 may identify sentences. For example, embeddings $E_A$ 506-1 to 506-5 identify a first sentence and embedding $E_B$ 506-6 identifies a second sentence. In this case, the first sentence is associated with user account watch history 118, the classifier [CLS], and the sentence separator [SEP]. The second sentence is associated with target video 204. Session encoder 210 uses the sentence embeddings 506 to identify the sentences in the input.

Position embeddings represent the position of words in a sentence and, in this case, the position of videos in user account watch history 118. For example, position embeddings $E_1$ to $E_5$ 508-1 to 508-5 represent the position of user account watch history 118 with respect to target video 204. The position of the classifier [CLS] and the sentence separator [SEP] are also represented in the position embeddings. The position embeddings allow each node (e.g., transformer) to know the position of a respective embedding within the order. Session encoder 210 predicts a likelihood that the second sentence will follow the first sentence. That is, session encoder 210 may predict whether a user account will view target video 204 after watch history 118.

Referring back to FIG. 2, upon receiving the above input, session encoder 210 analyzes the input and outputs a session representation 212. Session representation 212 may be a representation in a space for user account watch history 118 and target video 204. Session representation 212 may include a single representation for user account watch history 118 and target video 204.

A predictor 214 receives session representation 212 and then can generate a prediction. In some embodiments, the classifier [CLS] may indicate a classification for watch history 118 and target video 204. The classification may indicate the relevance between the watch history 118 and target video 204. Predictor 214 may take the session representation 212 and determine a probability that a user account would select target video 204 given the user account's watch history 118. In some embodiments, the prediction is a "click" probability on target video 204 that a user account will select the target video to view.

Recommendation system 106 may perform the above processing for multiple target videos 204 to generate predictions for each target video 204. Then, recommendation system 106 may generate recommendations for the user account.

Recommendations

Figure 6:
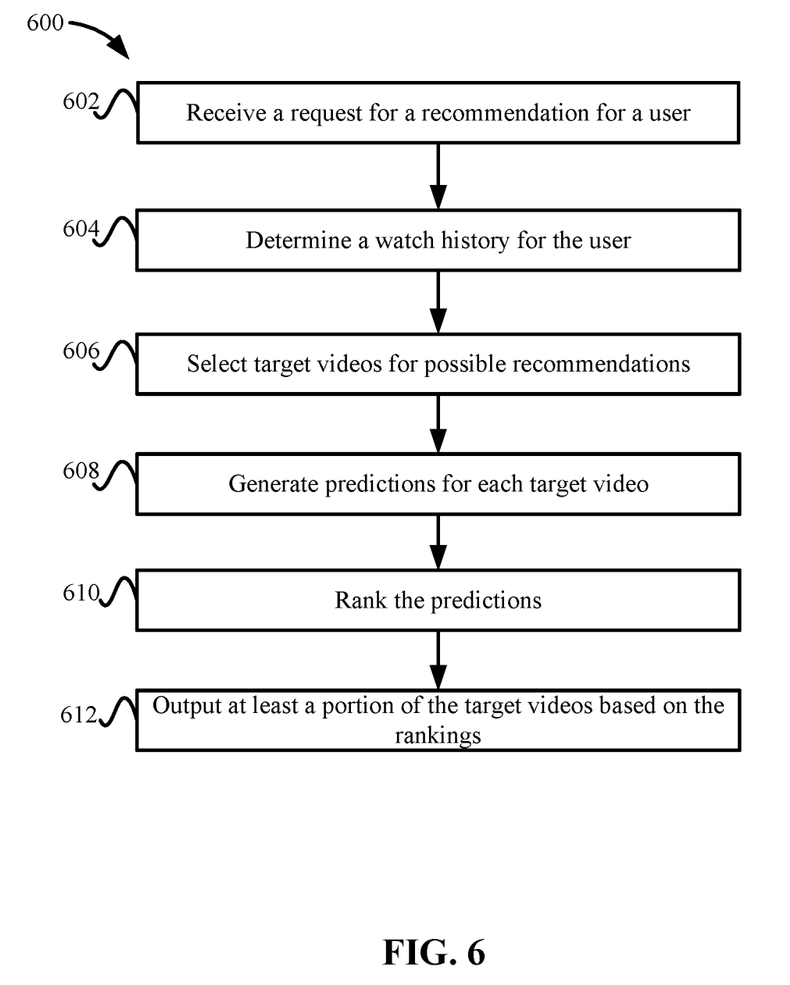
FIG. 6 depicts a simplified flowchart of a method for generating recommendations according to some embodiments.

Recommendation system 106 may be used to generate recommendations in real time for a user account. FIG. 6 depicts a simplified flowchart 600 of a method for generating recommendations according to some embodiments. At 602, recommendation system 106 receives a request for a recommendation for a user account. For example, interface 112 may be used by a user account and at certain points, interface 112 may output recommendations 114. Recommendation system 106 is then contacted to generate a recommendation in real time.

At 604, recommendation system 106 determines a watch history 118 for the user account. Watch history 118 may be for a defined period, such as for the previous day, days, weeks, months, years, etc.

At 606, recommendation system 106 selects target videos 204 for possible recommendations. Target videos 204 that are selected may be every video in a library being offered by video delivery system 108. In other embodiments, the target videos 204 may be a subset of videos, such as more popular videos or new videos (e.g., released within a certain time period) on video delivery system 108 that could be recommended.

At 608, recommendation system 106 generates predictions for each target video 204. For example, the predictions may be based on a probability a user account will select target video 204 if that video is output as the recommendation.

At 610, recommendation system 106 ranks the predictions, such as in an order of highest probability to lowest probability. Then, at 612, recommendation system 106 outputs at least a portion of target videos 204 based on the rankings. For example, recommendation system 106 may output the top-ranked video or the top ten-ranked target videos.

Training

By combining video and audio representation generator 206 and session encoder 210, recommendation system 106 may jointly train both to improve the recommendations. The training may use a label of the prediction outputted by predictor 214 to train video and audio representation generator 206 and/or session encoder 210 with a corresponding input of a watch history 118 and target video 204. The label of the prediction is used to supervise the learning of parameters for session encoder 210 and/or visual and audio representation generator 206. By training visual and audio representation generator 206 using the prediction, the generated video representation that is output by visual and audio representation generator 206 may be more accurate for generating video representations because the parameters are trained for the specific purpose of generating video representations for the prediction recommendation. Session encoder 212 may also be trained using the label of the prediction. Also, in other embodiments, visual and audio representation generator 206 and session encoder 210 may be trained separately also.

CONCLUSION

Accordingly, by treating watch history 118 and target video 204 as sentences, recommendation system 106 can determine whether the two sentences are relevant in terms of semantic meaning using the representations for each video. Recommendation system 106 may use a bi-directional correlation between the videos in watch history 118 to determine a better recommendation. A user account watch history 118 is different in that context in both backward and forward directions may provide useful information about the relevancy to target video 204. For example, videos watched before a respective video may provide some context as well as the videos watched after the respective video about the relevancy of watch history 118 to target video 204.

EXAMPLE EMBODIMENTS

In some embodiments, a method comprising: receiving, by a computing device, a history of videos that were viewed on a video delivery system as a first sentence in a sequential order and a target video as a second sentence as input to a prediction network; analyzing, by the computing device, representations for the history of videos and a representation of the target video using the prediction network, wherein the prediction network generates a session representation based on bidirectionally analyzing a sequence of the first representations and the second representation; and using, by the computing device, the session representation to determine whether to recommend the target video.

In some embodiments, the history of videos are in the sequential order based on a time in which respective videos are viewed by a user account.

In some embodiments, each representation of a video in the history of videos is represented as a word in the first sentence.

In some embodiments, receiving the history of videos as the first sentence and the target video as the second sentence comprises: receiving the first sentence as a first input of the representations for the history of videos, segment embeddings that indicate the representations are associated with the first sentence, and position embeddings that indicate a position in the sequential order of the first representation and the second representation, and receiving the second sentence as a second input of the representation for the target video, a segment embedding that indicate the representation is associated with the second sentence, and a position embedding that indicates a position in the sequential order of the first representation and the second representation.

In some embodiments, analyzing the representations for the history of videos and the representation of the target video using the prediction network comprises: analyzing the first input and the second input to generate the session representation.

In some embodiments, receiving the history of videos as the first sentence and the target video as the second sentence comprises: receiving a marker that represents an end of the first sentence and a beginning of the second sentence.

In some embodiments, receiving the history of videos as the first sentence and the target video as the second sentence comprises: receiving a classifier that classifies a relationship of the first sentence to the second sentence.

In some embodiments, the session representation is based on the representations for the history of the videos and a representation of the target video.

In some embodiments, the session representation is used to determine a probability a user account would select the target video to view based on the history of videos.

In some embodiments, the method further comprising: generating session representations for other target videos using the history of videos and the prediction network; and selecting at least a portion of the target video and the other target videos as a recommendation.

In some embodiments, the method further comprising: ranking the session representations for the target video and the other target videos; and selecting the at least the portion of the target video and the other target videos based on the ranking of the session representations.

In some embodiments, the method further comprising: outputting the at least the portion of the target video and the other target videos on an interface for a user account.

In some embodiments, analyzing the session representation to generate a prediction of whether a user account would select the target video.

In some embodiments, analyzing the representations for the history of videos and the representation of the target video using the prediction network comprises: analyzing each of the representations for the history of videos and the representation of the target video with respect to each other in one or more networks to output a transformed representations for the history of the videos and a transformed representation of the target video.

In some embodiments, the method further comprising: generating the representations for the history of videos and the representation of the target video based on analyzing content of each video in the history of the videos and the target video.

In some embodiments, the representations for the history of the videos and the representation of the target video are generated by bi-directionally analyzing portions of content of each video in the history of videos and portions of content of the target video.

In some embodiments, a non-transitory computer-readable storage medium having stored thereon computer executable instructions, which when executed by a computing device, cause the computing device to be operable for: receiving a history of videos that were viewed on a video delivery system as a first sentence in a sequential order and a target video as a second sentence as input to a prediction network; analyzing representations for the history of videos and a representation of the target video using the prediction network, wherein the prediction network generates a session representation based on bidirectionally analyzing a sequence of the first representations and the second representation; and using the session representation to determine whether to recommend the target video.

In some embodiments, each representation of a video in the history of videos is represented as a word in the first sentence.

In some embodiments, receiving the history of videos as the first sentence and the target video as the second sentence comprises: receiving the first sentence as a first input of the representations for the history of videos, segment embeddings that indicate the representations are associated with the first sentence, and position embeddings that indicate a position in the sequential order of the first representation and the second representation, and receiving the second sentence as a second input of the representation for the target video, a segment embedding that indicate the representation is associated with the second sentence, and a position embedding that indicates a position in the sequential order of the first representation and the second representation In some embodiments, an apparatus comprising: one or more computer processors; and a computer-readable storage medium comprising instructions for controlling the one or more computer processors to be operable for: receiving a history of videos that were viewed on a video delivery system as a first sentence in a sequential order and a target video as a second sentence as input to a prediction network; analyzing representations for the history of videos and a representation of the target video using the prediction network, wherein the prediction network generates a session representation based on bidirectionally analyzing a sequence of the first representations and the second representation; and using the session representation to determine whether to recommend the target video.

System

Figure 7:
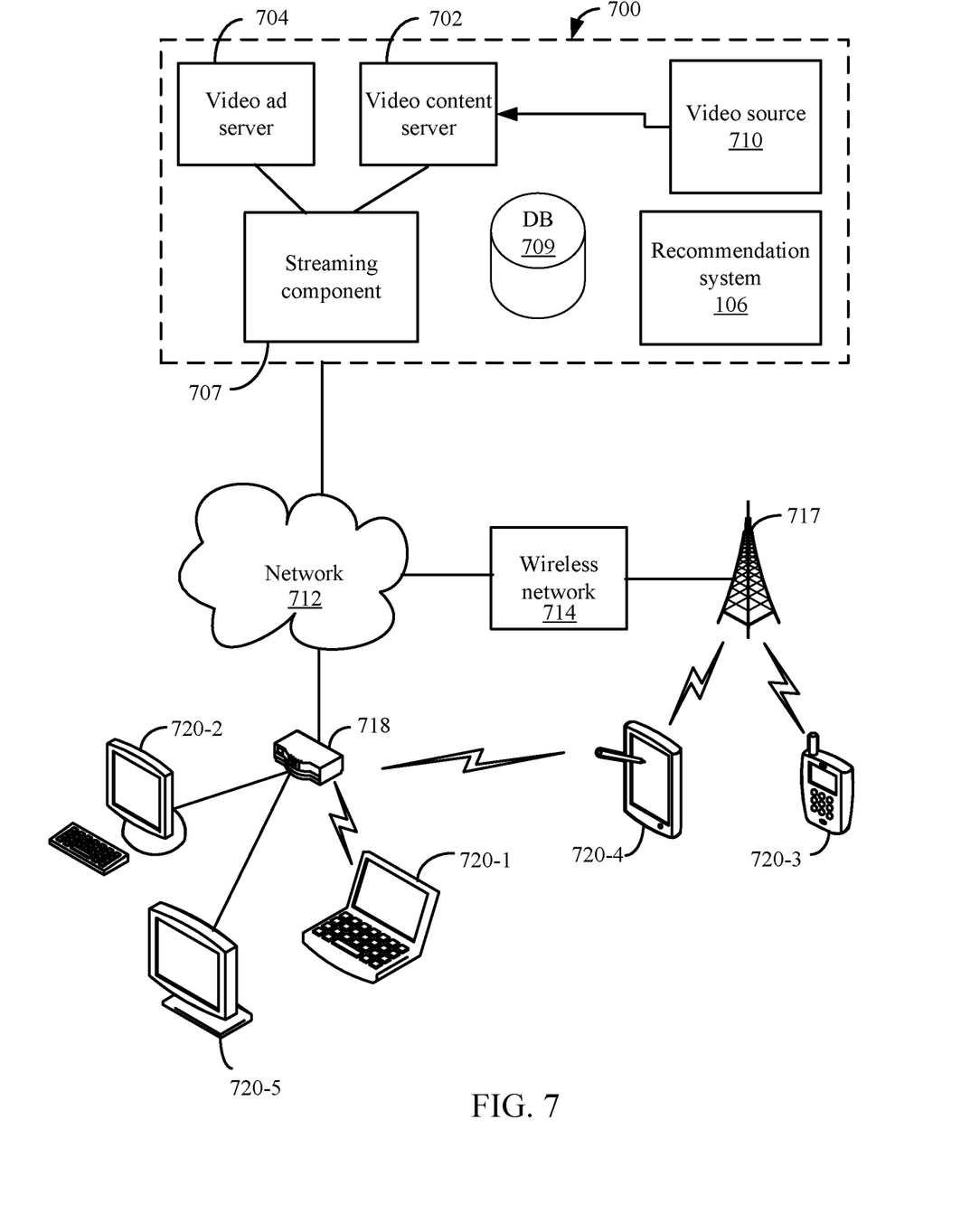
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include recommendation system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
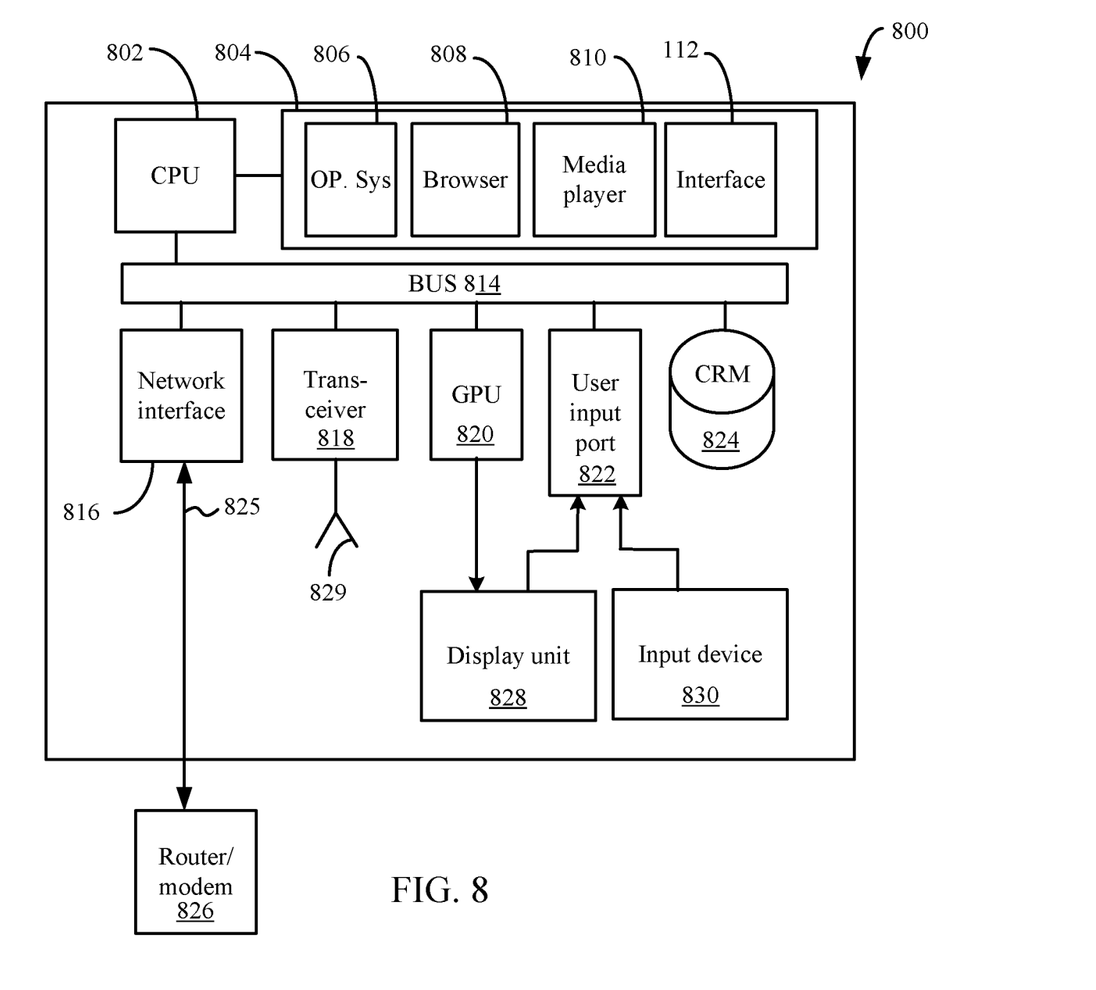
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include interface 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
inputting, by a computing device, a plurality of first representations for a history of content into a plurality of first inputs of a prediction network with first information that identifies the plurality of first representations as a first sentence and inputting a second representation of a target content into a second input of the prediction network with second information that identifies the target content as a second sentence, wherein the plurality of first inputs and the second input are input in a sequential order into a network of nodes for the prediction network with the first information and the second information;
analyzing, by the computing device, the plurality of the first representations for the history of content and the second representation of the target content via interconnections between nodes in the network of nodes, using the prediction network based wherein the interconnections bidirectionally analyze the plurality of the first representations as the first sentence using the first information and the second representation as the second sentence using the second information, wherein the prediction network generates a session representation that represents a relevance between the first sentence and the second sentence; and
using, by the computing device, the session representation to determine whether to recommend the target content.

2. The method of claim 1, wherein instances of content in the history of content are in the sequential order based on a time in which respective instances of content is viewed by a user account.

3. The method of claim 1, wherein each of the plurality of the first representations in the history of content is represented as a word in the first sentence.

4. The method of claim 1, wherein inputting the plurality of first representations as the first sentence and the second representation as the second sentence comprises:
receiving, into the plurality of first inputs, a first representation in the plurality of first representations for the history of content, a segment embedding as part of the first information that identifies the first representation as the first sentence, and a position embedding that indicates a position in the sequential order of the respective first representation, and
receiving, into the second input, the second representation for the target content, a segment embedding as the second information that identifies the second representation as the second sentence, and a position embedding that indicates a position in the sequential order of the second representation.

5. The method of claim 4, wherein analyzing the plurality of the first representations and the second representation comprises:
analyzing the first sentence and the second sentence to generate the session representation.

6. The method of claim 1, wherein inputting the plurality of the first representations as the first sentence and the second representation as the second sentence comprises:
inputting a marker into a third input of the prediction network, wherein marker represents an end of the first sentence and a beginning of the second sentence.

7. The method of claim 1, wherein inputting the plurality of the first representations as the first sentence and the second representation as the second sentence comprises:
inputting a classifier into a third input of the prediction network, wherein the classifier classifies a relationship of the first sentence to the second sentence.

8. The method of claim 1, wherein the session representation is based on the plurality of the first representations for the history of the content and the second representation of the target content.

9. The method of claim 1, wherein the session representation is used to determine a probability a user account would select the target content to view based on the history of content.

10. The method of claim 1, wherein the target content comprises a first target content, the method further comprising:
generating session representations for second target content using the history of content and the prediction network; and
selecting at least a portion of the first target content and the second target content as a recommendation.

11. The method of claim 10, further comprising:
ranking the session representations for the first target content and the second target content; and
selecting the at least the portion of the first target content and the second target content based on the ranking of the session representations.

12. The method of claim 11, further comprising:
outputting the at least the portion of the first target content and the second target content on an interface for a user account.

13. The method of claim 1, wherein:
analyzing the session representation to generate a prediction of whether a user account would select the target content.

14. The method of claim 1, wherein analyzing the plurality of the first representations and the second representation comprises:
analyzing each of the plurality of the first representations for the history of content and the second representation of the target content with respect to each other via the interconnections between the nodes in the network of nodes to output a transformed plurality of first representations for the history of the content and a transformed second representation of the target content.

15. The method of claim 1, further comprising:
generating the plurality of the first representations for the history of content and the second representation of the target content based on analyzing content of each instance of content in the history of content and the content of the target content.

16. The method of claim 1, wherein the plurality of the first representations for the history of the content and the second representation of the target content are generated by bidirectionally analyzing portions of content of each content in the history of content and portions of content of the target content.

17. A non-transitory computer-readable storage medium having stored thereon computer executable instructions, which when executed by a computing device, cause the computing device to be operable for:
inputting a plurality of first representations for a history of content into a plurality of first inputs of a prediction network with first information that identifies the plurality of first representations as a first sentence and inputting a second representation of a target content into a second input of the prediction network with second information that identifies the target content as a second sentence, wherein the plurality of first inputs and the second input are input in a sequential order into a network of nodes for the prediction network with the first information and the second information;

analyzing the plurality of the first representations for the history of content and the second representation of the target content via interconnections between nodes in the network of nodes, wherein the interconnections bidirectionally analyze the plurality of the first representations as the first sentence using the first information and the second representation as the second sentence using the second information, wherein the prediction network generates a session representation that represents a relevance between the first sentence and the second sentence; and using the session representation to determine whether to recommend the target content.

18. The non-transitory computer-readable storage medium of claim 17, wherein each of the plurality of the first representations in the history of content is represented as a word in the first sentence.

19. The non-transitory computer-readable storage medium of claim 17, wherein inputting the plurality of first representations as the first sentence and the second representation as the second sentence comprises:

receiving, into the plurality of first inputs, a first representation in the plurality of first representations for the history of content, a segment embedding as part of the first information that identifies the first representation as the first sentence, and a position embedding that indicates a position in the sequential order of the respective first representation, and receiving, into the second input, the second representation for the target content, a segment embedding as the second information that identifies the second representation as the second sentence, and a position embedding that indicates a position in the sequential order of the second representation.

20. An apparatus comprising:

one or more computer processors; and a computer-readable storage medium comprising instructions for controlling the one or more computer processors to be operable for:

inputting a plurality of first representations for a history of content into a plurality of first inputs of a prediction network with first information that identifies the plurality of first representations as a first sentence and inputting a second representation of a target content into a second input of the prediction network with second information that identifies the target content as a second sentence, wherein the plurality of first inputs and the second input are input in a sequential order into a network of nodes for the prediction network with the first information and the second information;

analyzing the plurality of first representations for the history of content and the second representation of the target content via interconnections between nodes in the network of nodes, wherein the interconnections bidirectionally analyze the plurality of the first representations as the first sentence using the first information and the second representation as the second sentence using the second information, wherein the prediction network generates a session representation that represents a relevance between the first sentence and the second sentence; and using the session representation to determine whether to recommend the target content.

\* \* \* \* \*

UNITED STATES PATENT AND TRADEMARK OFFICE
CERTIFICATE OF CORRECTION

PATENT NO. : 11,564,013 B2
APPLICATION NO. : 17/074225
DATED : January 24, 2023
INVENTOR(S) : Peng Wang et al.

It is certified that error appears in the above-identified patent and that said Letters Patent is hereby corrected as shown below:

In the Claims

In Claim 1, Column 15, Line 27, please delete "using the prediction network based"

In Claim 8, Column 16, Line 12, please change "history of the content" to -- history of content --

In Claim 16, Column 16, Line 57, please change "history of the content" to -- history of content --

Signed and Sealed this
Fourteenth Day of March, 2023

Katherine Kelly Vidal
*Director of the United States Patent and Trademark Office*